(12) United States Patent
Dunn et al.

(10) Patent No.: US 8,125,494 B2
(45) Date of Patent: Feb. 28, 2012

(54) METHOD FOR MAPPING OPTICAL PROPERTIES FOR A DISPLAY DEVICE

(75) Inventors: William Dunn, Alpharetta, GA (US); Haseeb Shekhani, Alpharetta, GA (US)

(73) Assignee: American Panel Corporation, Alpharetta, GA (US)

( * ) Notice: Subject to any disclaimer, the term of this patent is extended or adjusted under 35 U.S.C. 154(b) by 783 days.

(21) Appl. No.: 12/266,121

(22) Filed: Nov. 6, 2008

(65) Prior Publication Data
US 2009/0251467 A1    Oct. 8, 2009

Related U.S. Application Data

(60) Provisional application No. 61/042,148, filed on Apr. 3, 2008.

(51) Int. Cl.
*G09G 5/02* (2006.01)
*G06T 11/20* (2006.01)

(52) U.S. Cl. .......... 345/589; 345/440; 345/596
(58) Field of Classification Search ......... 345/440, 345/589, 596
See application file for complete search history.

(56) References Cited

U.S. PATENT DOCUMENTS

| | | | | |
|---|---|---|---|---|
| 6,717,576 | B1 * | 4/2004 | Duluk et al. | 345/419 |
| 7,328,116 | B2 * | 2/2008 | Bala et al. | 702/107 |
| 7,798,645 | B2 * | 9/2010 | Roser | 351/223 |
| 2003/0122850 | A1 * | 7/2003 | Koneru et al. | 345/620 |
| 2006/0247877 | A1 * | 11/2006 | Bala et al. | 702/107 |
| 2007/0091334 | A1 * | 4/2007 | Yamaguchi et al. | 358/1.9 |

* cited by examiner

*Primary Examiner* — M Good Johnson
(74) *Attorney, Agent, or Firm* — Standley Law Group LLP

(57) ABSTRACT

Exemplary embodiments provide a method for characterizing the optical display properties of a display. ISO-Inversion and ISO-Contrast charts are generated to pinpoint limitations in the display and trouble shoot the same.

19 Claims, 4 Drawing Sheets

METHOD FOR MAPPING OPTICAL PROPERTIES FOR A DISPLAY DEVICE

CROSS-REFERENCE TO RELATED APPLICATIONS

This application is a non-provisional application and claims priority to co-pending application No. 61/042,148 filed on Apr. 3, 2008, herein incorporated by reference in its entirety.

SUMMARY OF AN EXEMPLARY EMBODIMENT INVENTION

Exemplary embodiments relate generally to a method for mapping the optical properties for a display screen, for example a liquid crystal display. In some embodiments, a single set of test data are used to generate both an ISO-Inversion chart and an ISO-Contrast chart. Such charts are useful in identifying operational limitations of the display device when viewed from a position not normal to the screen surface.

BACKGROUND OF THE ART

For example, in a liquid crystal display ("LCD") device the light signal of each individual display element does not emanate as a point source located on the front surface of the device. Instead, the light signal originates in one or more backlight sources positioned behind the front surface. The light signal passes through a veritable tunnel of layers, including a layer of angularly-twistable liquid crystals, so the light apparently emanates from a source internal to the device. The amount of angular twisting of the liquid crystal fluid material changes as a function of a voltage applied to an individual display element. This voltage is usually referred to as the "gray scale voltage." More often, in fact, the voltage is normalized so that the full range of gray scale levels is represented by a number of subdivisions equal to a power of two. Most typically, gray scale levels are expressed as a number between 0 to 63 or between 0 to 255. At a gray scale level of "0", the display element shows its darkest black; at the highest level of "63" or "255", the display element shows its brightest white. As a result of these and other effects, a user's ability to perceive both the brightness and the color of the overall screen is a function of the user's position relative to a line projecting normal from the center of the front surface.

Because of the various effects described above, any viewer of an active matrix LCD who is not located precisely on a normal projecting outwardly from the center of the screen will have a view of the screen that is impaired to some degree. Because it is difficult for an individual user to maintain this ideal position precisely, and because it is impossible for more than one user of the screen to simultaneously occupy this ideal position, there will almost always be consequences from the non-ideal LCD screens in common use.

One of these consequences is an effect generally referred to as "gray scale inversion." When the gray scale voltage applied to the individual display elements increases, the luminance of the screen perceived by a viewer at any particular point should increase monotonically, that is, the luminance should consistently increase without oscillations in which decreases occur. This is not to say that the rate of increase will be constant. In fact, as taught by one of the present inventors in U.S. Pat. No. 6,809,746 at FIG. 8, the transmission or luminance of a screen usually increases in an "S"-shape manner as gray scale increases.

There are, however, angular positions in front of an LCD screen where the measured luminance will decrease as the gray scale value is increased. Such positions are said to experience "gray scale inversion" at that particular gray scale level. Most typically, these gray scale inversions will occur, if at all, towards the lower end of the gray scale continuum.

A related property of a screen of this type is "viewing angle," which is an often mis-understood concept. Many people believe viewing angle to be the maximum angle at which one can view a screen without losing brightness or color shifts. Actually, viewing angle is related to "contrast ratio," which is, in turn, defined as the ratio of the brightness of a screen when all display elements are set to a maximum gray scale level (the screen is "white") to the brightness of the screen when all display elements are set to a minimum gray scale level (the screen in "black"). A "straight on" viewer may have a contrast ratio of at least 250:1. As the viewer moves off center, the contrast ratio decreases. One is considered to be within the "viewing angle" as long as the contrast ratio exceeds an arbitrary value, typically 10:1 or 5:1. Assuming certain symmetries of the screen, if a viewer can move 70° off center before the contrast ratio declines from 250:1 to 10:1, then the screen is said to have a viewing angle of 140°, since a symmetrical screen would be in the desired contrast ratio range from a viewer inclination between 70° to one side to 70° to the other side. It is often observed that the "reading angle" for a screen is typically smaller than the viewing angle, since the minimum acceptable contrast ratio for reading information from a screen is larger than 10:1.

Gray scale inversion is always undesirable, but in many applications, it can be absolutely unacceptable, such as when the screen is used as an avionics display in an aircraft operating under instrument flight rules. In such cases, it is critical to be able to rapidly and reliably determine the performance characteristics of a display under test (DUT) so that its limitations are resolved (or at least known) prior to implementation.

In addition to the novel features and advantages mentioned above, other features and advantages will be readily apparent from the following descriptions of the drawings and exemplary embodiments.

BRIEF DESCRIPTION OF THE DRAWINGS

A better understanding of the exemplary embodiments will be obtained when reference is made to the appended drawings, wherein identical parts are identified with identical reference numbers and wherein.

DETAILED DESCRIPTION OF A PREFERRED EMBODIMENT

Figure 1:
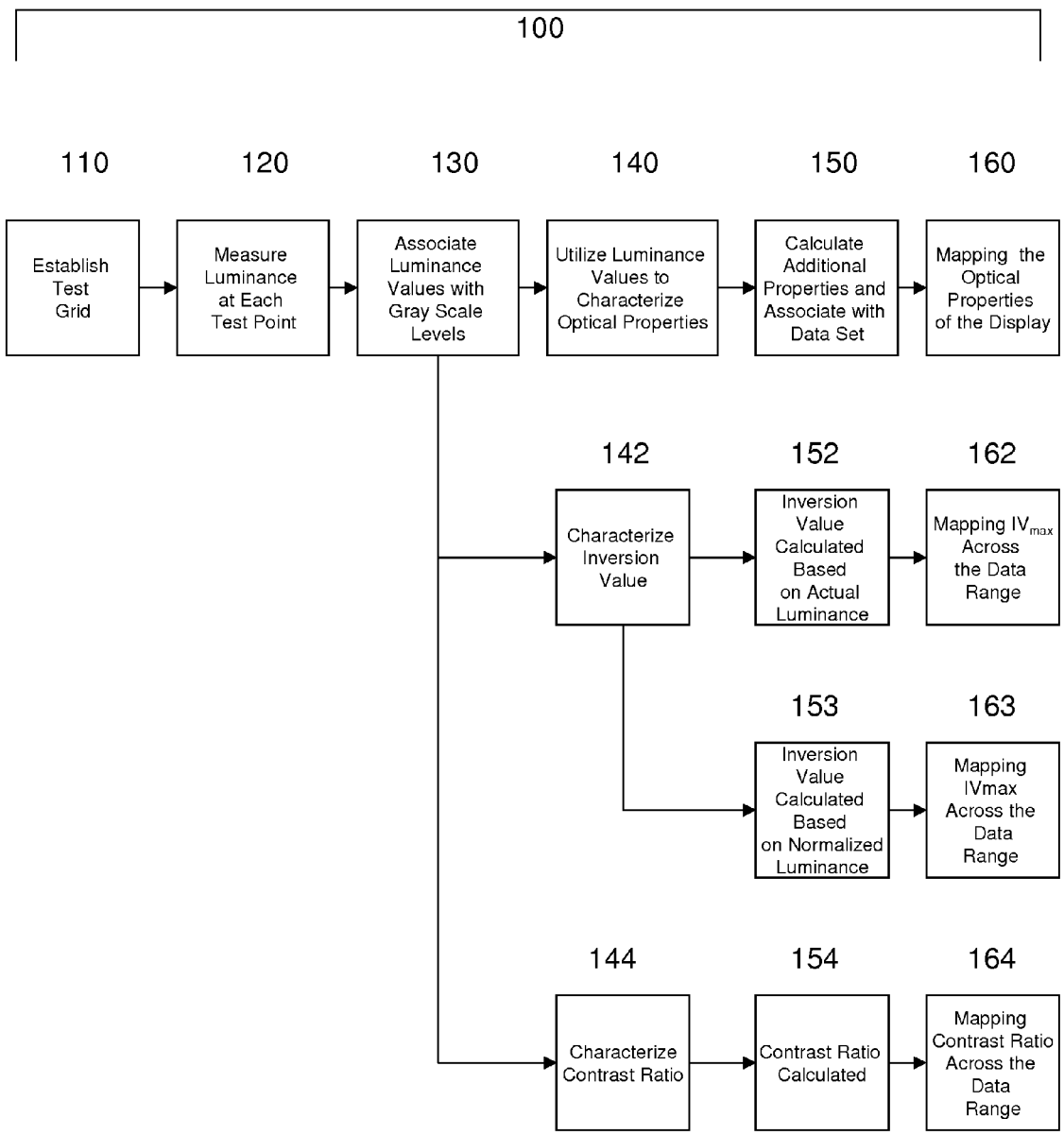
FIG. 1 is a schematic representing various embodiments of the invention.

FIG. 1 shows, in schematic representation, the method 100 of the preferred embodiment. The first step 110 is to establish a test grid for use in association with the display under test. In establishing this test grid, a plurality of test points is selected. One test point should be located normal to the center point of the screen, that is, with a horizontal inclination of 0° and a vertical inclination of 0°. Beyond this, additional test points are selected to populate the test grid. In a preferred embodiment of the method, this test grid is populated by test points that are non-normal to the screen. By this, it is meant that the test points may be characterized by a data set of the form (H, V), where H is a horizontal inclination and V is a vertical inclination. H and V can each vary from −90° to +90°, although it will be noted that in many situations, the most important test points are those in which both H and V have an absolute value between 20 and 70. When either H or V has an absolute value greater than 70, and especially when either H or V has an absolute value greater than 80, it is likely that the test point may be beyond the viewing area of the screen. In a similar manner, when both H and V have absolute values less than 20, the test point is significantly likely to be well within the viewing area. Although an arrangement of test points that is symmetrical about the normal test point at (0, 0) is a preferred arrangement, it is not required to practice the invention.

Briefly explained, the test points are preferably located along the surface of a virtual hemisphere centered at the center point of the display. Such a hemisphere has a horizontal equator located directly above the horizontal centerline of the display and a vertical equator located directly above the vertical centerline. The horizontal inclinations can be perceived as horizontal longitude lines, that is, they are great circle portions, with the positive inclinations lying above the horizontal centerline and negative inclinations lying below it. Similarly, the vertical inclinations can be perceived as vertical longitude lines, with the positive inclinations positioned to the right of the vertical centerline and negative inclinations lying to the left.

The second step 120 of the preferred embodiment is to measure a luminance of the display device at each test point. This is done at each of a plurality of pre-selected gray scale levels. These luminance measurements should be conducted across the full range of gray scale, which, for some displays will cover a range of from 0 to 63 and for other displays will cover a range of from 0 to 255, although the difference is only one of numbering. To properly assess the optical properties of interest, there should be at least ten luminance measurements taken at each test point. It is not critical to the exemplary embodiments that the luminance readings be taken at consistent intervals of gray scale level. Since inversion is most likely to be observed at lower levels of gray scale, it is preferred to make measurements at smaller intervals there than in higher gray scale levels.

In conducting this second step 120, it is also not necessary that the luminance measurements be made at the same gray scale intervals at each test point or that the same number of luminance measurements be made at each test point. The preference of making a consistent number of measurements at each data point, at consistent gray scale levels, is merely one of convenience with the data collected.

The third step 130 of the method 100 of the preferred embodiment is to associate a measured luminance value with each selected gray scale level at each test point, thereby defining a matrix of data sets. An example from an actual measurement can illustrate this step clearly. It should be noted that the measurement tables which follow are for illustration only. The following measurement tables come from a sample experiment.

In this sample experiment, luminance measurements were made at a horizontal inclination of 0° and a vertical inclination of −60°, twenty-six measurements were made over a 64 point gray scale range. In the gray scale level range from 0 to 8, measurement was made at each one point interval:

TABLE 1

| | GS | | | | | | | | |
|---|---|---|---|---|---|---|---|---|---|
| | 0 | 1 | 2 | 3 | 4 | 5 | 6 | 7 | 8 |
| Lum. | .4 | .4 | .6 | .7 | .8 | .9 | 1.1 | 1.2 | 1.4 |

In the gray scale level range from 10 to 20, luminance measurements were taken at two point intervals:

TABLE 2

| | GS | | | | | |
|---|---|---|---|---|---|---|
| | 10 | 12 | 14 | 16 | 18 | 20 |
| Lum. | 2.0 | 2.5 | 3.1 | 3.8 | 4.6 | 5.5 |

In the gray scale level range between 24 and 63, luminance measurements were taken at four point intervals (except between 60 and 63, where a three point interval was used):

TABLE 3

| | GS | | | | | | | | | | |
|---|---|---|---|---|---|---|---|---|---|---|---|
| | 24 | 28 | 32 | 36 | 38 | 42 | 48 | 52 | 56 | 60 | 63 |
| Lum. | 8.0 | 11.2 | 14.9 | 18.2 | 23.7 | 29.5 | 35.3 | 44.2 | 53.5 | 61.8 | 70.5 |

From this data, we can construct a series of data sets of the type (H,V,G,L) where H is horizontal inclination (in degrees), V is vertical inclination (in degrees), G is the gray scale level and L is the luminance. Once such example, taken from Table 2, would be (0, −60, 14, 3.1).

The fourth step 140 of the preferred embodiment of the method 100 is to use the measured luminance values to characterize one of the optical properties of the display device. For a first variation 142 of this fourth step 140, the optical property of interest is gray scale inversion, which exists for a predetermined test point if the luminance value of a data set at a selected gray scale level is lower than the luminance value associated with the same test point at the adjacent lower gray scale level. There are no gray scale inversions in the data of Tables 1-3, but if data from the same experiment at a horizontal inclination of −50 and a vertical inclination of −50 are used instead, the following data is seen:

TABLE 4

| | GS | | | | | | | | |
|---|---|---|---|---|---|---|---|---|---|
| | 0 | 1 | 2 | 3 | 4 | 5 | 6 | 7 | 8 |
| Lum. | 1.4 | 1.3 | 1.2 | 1.1 | 1.1 | 1.0 | 1.1 | 1.3 | 1.4 |

In this data, inversions are observed between 0 and 1, between 1 and 2, between 2 and 3, and between 4 and 5. Although not shown, data for this experiment showed no further gray scale level inversions in the range of gray scale level from 10 to 63.

The fifth step 150 in the preferred embodiment is to calculate the additional property of the display device and associate these calculations with the data set from the previous steps. In one variation of a fifth step 152, an inversion value is calculated and associated with each data set. In this variation, the inversion value is defined as:

"0", when the luminance value associated with the data set is equal to or greater than the luminance value of the data set for the same test point at the adjacent lower gray scale level;

"0", when there is no adjacent lower gray scale level; and a positive non-zero value, when the luminance value associated with the data set is less than the luminance value of the data set for the same test point at the adjacent lower gray scale level, the magnitude of the positive non-zero value being determined by the gray scale level at which the decrease in luminance value occurs.

Using this definition of inversion value, the data from Table 4 can be restated, associating an inversion value with the data, as follows:

TABLE 5

| | GS | | | | | | | | |
|---|---|---|---|---|---|---|---|---|---|
| | 0 | 1 | 2 | 3 | 4 | 5 | 6 | 7 | 8 |
| Lum. | 1.4 | 1.3 | 1.2 | 1.1 | 1.1 | 1.0 | 1.1 | 1.3 | 1.4 |
| IV | 0 | 1 | 2 | 3 | 0 | 5 | 0 | 0 | 0 |

Expanding the data set definition from above, we can construct a series of data sets of the type (H, V, G, L, IV) now, with IV being the inversion value. Using this data set definition and the data of Table 5, one such data set is (−50, −50, 5, 1.0, 5).

Figure 2:
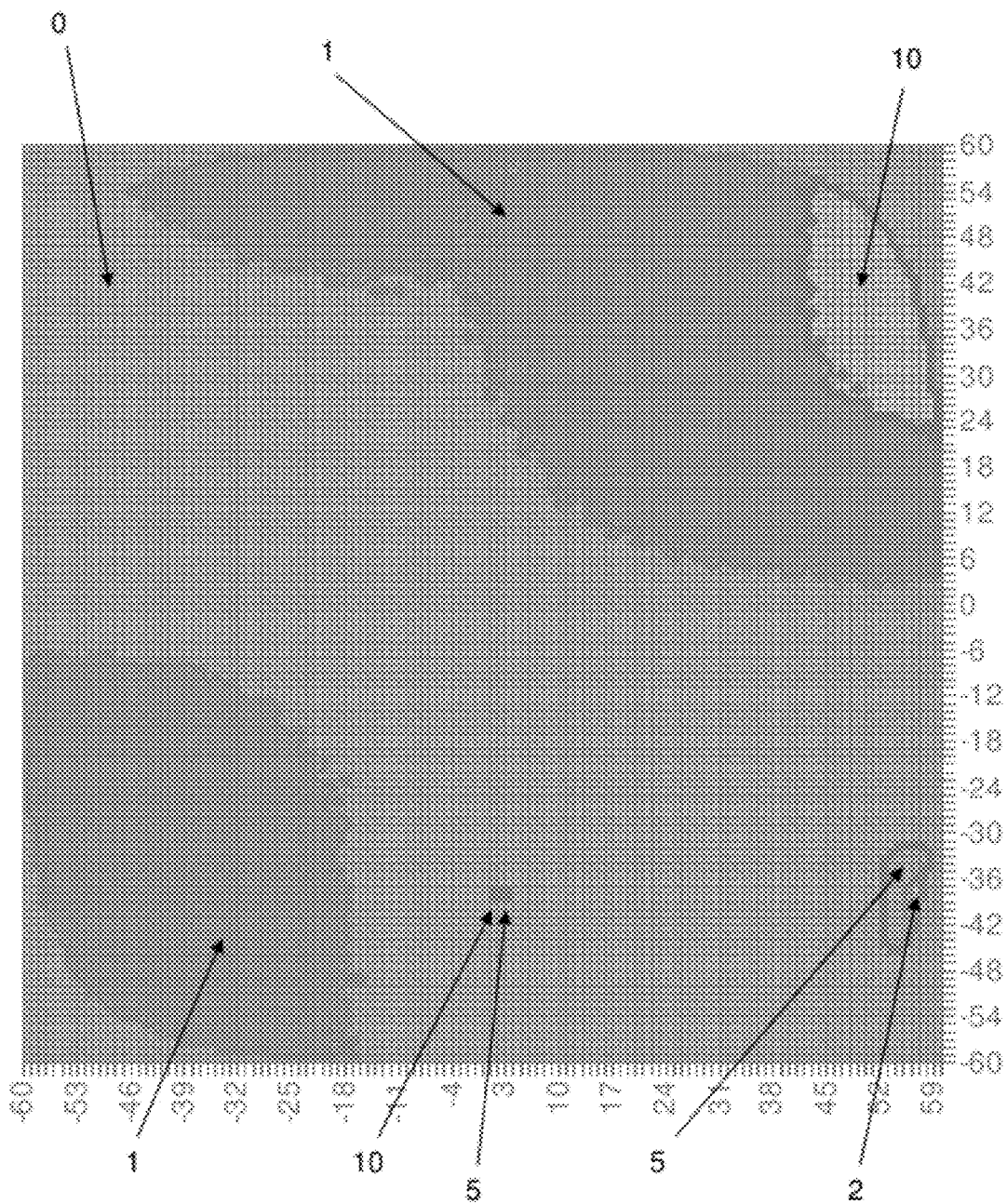
FIG. 2 is a plot showing the maximum inversion found at each test point, calculated based on the actual luminance values.

At this point, a sixth step 160 of the preferred embodiment is to map the optical properties for the particular device using the data sets. In one variation of the sixth step 162, an iso-inversion chart is generated by identifying a maximum inversion value for each test point and to construct a three-dimensional data vector for that data point. The three-dimensional data vector is of the type (H, V, $IV_{max}$), where $IV_{max}$ is the maximum inversion value over the gray scale level range for a given value of H and V. From data in Table 5, the data vector would be (−50, −50, 5) and from the data from Tables 1-3, another data vector from the same experiment would be (0, −60, 0), since no gray scale inversion was observed at that location. With these data vectors in hand, a variety of mapping variations are available. An exemplary method of mapping would present horizontal and vertical inclination as the respective horizontal and vertical axes, with lines connecting points of identical maximum inversion values. Such a method could produce a plot, and using the data presented above, is shown as FIG. 2. Color may be used to illustrate test points which have inversion values within the same range. Shown in FIG. 2 are the maximum inversion values for the shaded regions.

In a variation 153 of the fifth step 150, a normalized luminance ($Lum_N$) value is associated with each observed gray scale level at each test point, in which case each luminance value is replaced in the data set by the normalized luminance value. One exemplary manner of normalizing the luminance values is to determine the minimum and maximum observed luminance over the range of gray scale levels for a predetermined test point, the absolute value of the difference between the minimum and maximum luminance values defining a luminance range. From this, an effective luminance is established for each observed gray scale level, defined as a difference between the maximum observed luminance and the minimum observed luminance. Dividing the effective luminance by the luminance range yields a normalized luminance. It will be recognized that the minimum observed luminance at each data point will have a normalized luminance of 0 and the maximum observed luminance will have a normalized luminance value of 1. Applying this method to the data of Tables 1 and 2, where the minimum observed luminance is 0.4 and the maximum observed luminance is 70.5, the following normalized luminance ($Lum_N$) values are found:

TABLE 6

| | GS | | | | | | | | |
|---|---|---|---|---|---|---|---|---|---|
| | 0 | 1 | 2 | 3 | 4 | 5 | 6 | 7 | 8 |
| $Lum_N$ | 0 | 0 | .003 | .004 | .006 | .007 | .01 | .011 | .014 |

TABLE 7

| | GS | | | | | | | | | | |
|---|---|---|---|---|---|---|---|---|---|---|---|
| | 24 | 28 | 32 | 36 | 38 | 42 | 48 | 52 | 56 | 60 | 63 |
| $Lum_N$ | .108 | .154 | .213 | .254 | .332 | .415 | .498 | .625 | .758 | .876 | 1.00 |

From this point, the normalized luminance can be substituted into the data set for the luminance and an inversion value based on the normalized luminance may be determined. The data from Tables 6 and 7 are not used to exemplify this, as there is no inversion observed at any gray scale level, that is, $IV_{max}$ equals 0. However, from the illustrative experiment, if the luminance data taken at a horizontal inclination of 50 and a vertical inclination of 30 are normalized in the same manner (using a minimum luminance of 1.709 at a gray scale level of 10 and a maximum luminance value of 67.15 measured at a gray scale level of 63), then Tables 8 through 10 are generated:

TABLE 8

| | GS | | | | | | | | |
|---|---|---|---|---|---|---|---|---|---|
| | 0 | 1 | 2 | 3 | 4 | 5 | 6 | 7 | 8 |
| $Lum_N$ | .017 | .014 | .010 | .008 | .006 | .004 | .003 | .0014 | .0007 |
| IV | 0 | 1 | 2 | 3 | 4 | 5 | 6 | 7 | 8 |

TABLE 9

| | GS | | | | | |
|---|---|---|---|---|---|---|
| | 10 | 12 | 14 | 16 | 18 | 20 |
| $Lum_N$ | 0.0 | .0008 | .003 | .007 | .012 | .020 |
| IV | 10 | 0 | 0 | 0 | 0 | 0 |

TABLE 10

| | GS | | | | | | | | | | |
|---|---|---|---|---|---|---|---|---|---|---|---|
| | 24 | 28 | 32 | 36 | 38 | 42 | 48 | 52 | 56 | 60 | 63 |
| $Lum_N$ | .047 | .087 | .139 | .189 | .272 | .364 | .453 | .624 | .722 | .822 | 1.0 |
| IV | 0 | 0 | 0 | 0 | 0 | 0 | 0 | 0 | 0 | 0 | 0 |

Using the three-dimensional data vector (H, V, $IV_{max}$) introduced above, these tables are reduced to (50, 30, 10), which can be used for a mapping method.

Figure 3:
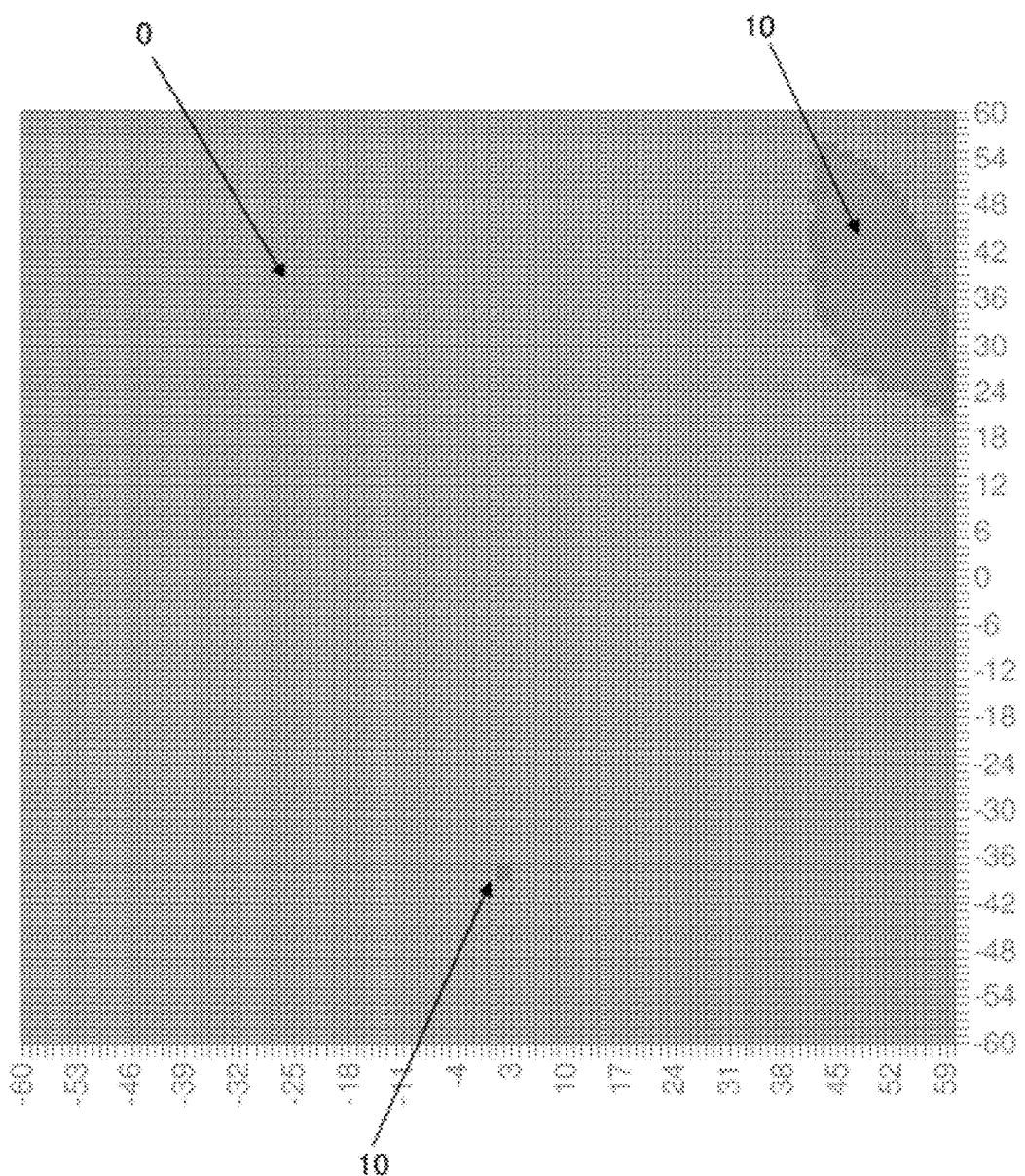
FIG. 3 is a plot showing the maximum inversion found at each test point, calculated based on normalized luminance values.

Applying this across the entire range 163, the optical property of gray scale inversion based on normalized luminance can be mapped. FIG. 3 shows a plot which can be generated based on the mapping method. This plot provides a comprehensive determination of gray scale inversion and can be used to both pinpoint and trouble-shoot issues with the display. Areas with the same maximum inversion value are shown in FIG. 3.

Reverting to the earlier description of the fourth step 140 of the method 100, a second variation 144 can also be illustrated, using the same luminance data collected in the first 110 through third 130 steps. In this second variation 144, the optical property under test is contrast ratio. For this purpose, contrast ratio is defined as a ratio of the luminance at a second (and higher) gray scale level to the luminance at a first (and lower) gray scale level. As this can result in an undefined division by zero when the measured luminance at the first gray scale level is zero, the ratio is defined as being "0" when the luminance value at the first gray scale level is zero.

In general, an exemplary measure of the contrast ratio will use the luminance values measured at the lowest and highest gray scale levels at which data are taken for a given horizontal and vertical inclination as the first and second gray scale levels. In such an embodiment, the fifth step 154 of the method will calculate the contrast ratio value for each data set in the matrix. As an example from the illustrative experiment, at a horizontal inclination of 0 and a vertical inclination of −60, that is, using the data in Tables 1-3 above, the luminance at gray scale level 0 is 0.4 and the luminance at gray scale level 63 is 70.5. From this, the contrast ratio value is 176.25. This can be presented in a data set (H, V, C), where H is horizontal inclination, V is vertical inclination and C is the contrast ratio, as (0, −60, 176.25).

Figure 4:
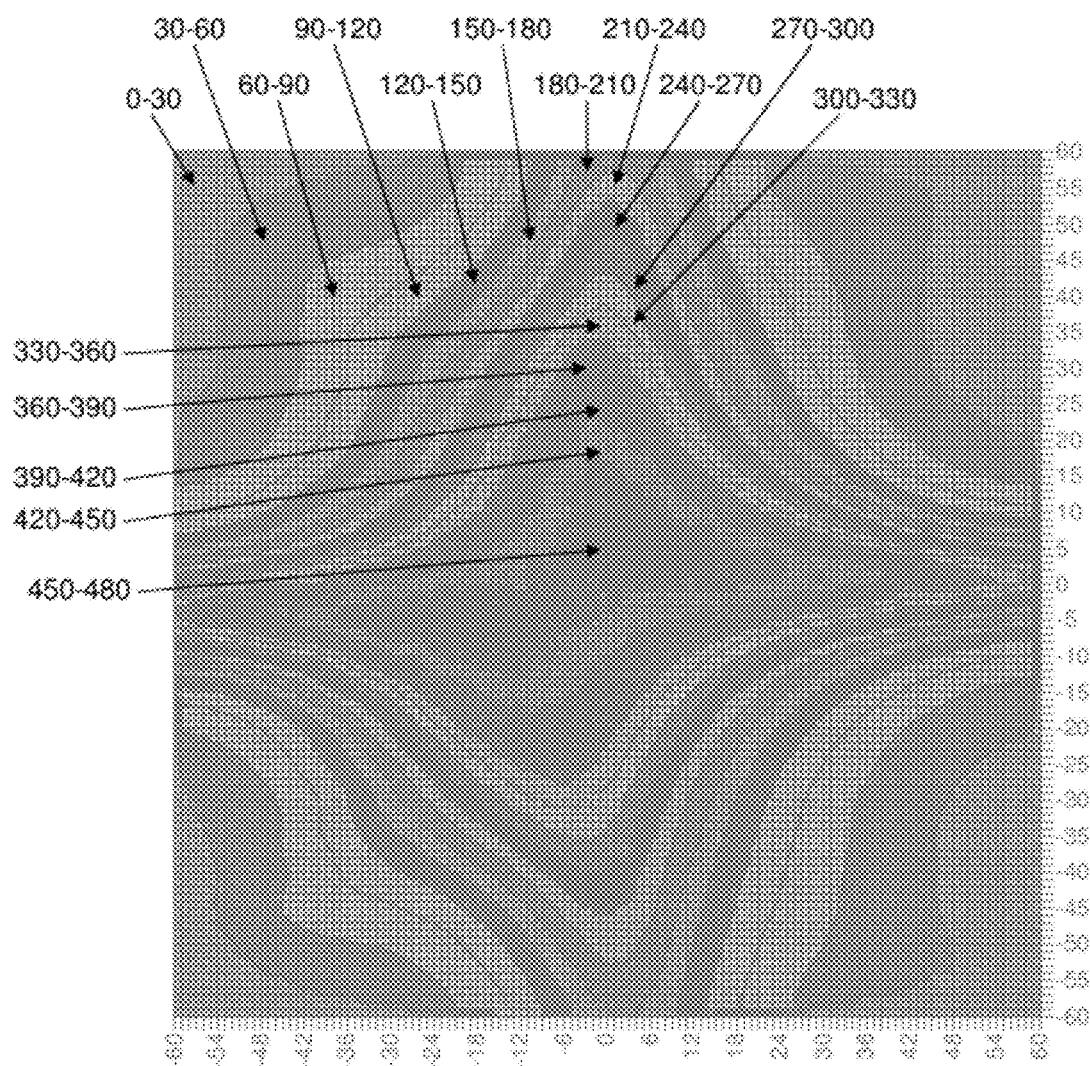
FIG. 4 is a plot showing the contrast ratio found at each test point.

Applying this across the entire range 164, the optical property of contrast ratio can be mapped. FIG. 4 shows a plot which can be generated based on the mapping method. This plot provides a comprehensive determination of contrast ratio and can be used to both pinpoint and trouble-shoot issues with the display.

In one variation, the ISO-Contrast chart is generated by presenting horizontal and vertical inclination as the respective horizontal and vertical axes, with lines connecting points of identical contrast ratio values. Color may be used to illustrate test points which have a contrast ratio within a given range. Here, FIG. 4 shows shaded areas which have a contrast ratio within a given range.

While certain embodiments are described in detail above, the scope of the invention is not to be considered limited by such disclosure. Those skilled in the art may modify the above embodiments without departing from the spirit of the invention. It is the intent therefore, to limit the invention only as evidenced by the following claims.

What is claimed is:

1. A method for characterizing the optical display properties of a display device having a center point, comprising the steps of:
   establishing a test grid, the test grid comprising a test point normal to the center point and a plurality of non-normal test points, each non-normal test point characterized by an angular inclination in a horizontal direction and an angular inclination in a vertical direction;
   measuring the luminance of the display device at each test point at each of a plurality of pre-selected gray scale levels;
   associating a measured luminance value with each selected gray scale level at each test point, thereby defining a matrix of data sets; and
   using the measured luminance values to characterize the optical properties of the display device.

2. The method of claim 1, wherein:
   the optical display property is gray scale inversion, which exists for a predetermined test point if the luminance value of a data set at a selected gray scale level is lower than the luminance value associated with the same test point at the adjacent lower gray scale level.

3. The method of claim 2, further comprising the steps of:
   normalizing the measured luminance values for each test point at each observed gray scale level before the step of determining gray scale inversions; and
   replacing the measured luminance value in each data set with the normalized luminance value.

4. The method of claim 3, wherein the normalizing step comprises the steps of:
   determining a minimum observed luminance over the range of gray scale levels for a predetermined test point;
   determining a maximum observed luminance over the range of gray scale levels for a predetermined test point;
   determining a luminance range, defined as a difference between the maximum observed luminance and the minimum observed luminance;
   determining an effective luminance for each gray scale level, defined as a difference between the observed luminance and the minimum observed luminance; and
   determining a normalized luminance for each gray scale level, defined as a ratio of the effective luminance to the luminance range.

5. The method of claim 4, further comprising the step of:
   associating an inversion value with each data set, the inversion value defined as being:
   zero, when the luminance value associated with the data set is equal to or greater than the luminance value of the data set for the same test point at the adjacent lower gray scale level;

zero, when there is no adjacent lower gray scale level; and a positive non-zero value, when the luminance value associated with the data set is less than the luminance value of the data set for the same test point at the adjacent lower gray scale level, the magnitude of the positive non-zero value being determined by the gray scale level at which the decrease in luminance value occurs.

6. The method of claim 5, further comprising the step of: generating an ISO-Inversion chart for the display device.

7. The method of claim 6, wherein the step of generating the ISO-Inversion chart comprises the steps of:

identifying a maximum value of the inversion values associated with the data sets for each test point;

using the identified maxima to generate a matrix of data vectors containing three values, where two of the data values correspond to the horizontal and vertical inclination values for a selected test point and the third data value corresponds to the maximum inversion value for the test point; and graphically representing the data from the matrix, using the horizontal and vertical inclination values as the axes.

8. The method of claim 2, further comprising the step of: associating an inversion value with each data set, the inversion value defined as being:

zero when the luminance value associated with the data set is equal to or greater than the luminance value of the data set for the same test point at the adjacent lower gray scale level;

zero when there is no adjacent lower gray scale level; and a positive non-zero value when the luminance value associated with the data set is less than the luminance value of the data set for the same test point at the adjacent lower gray scale level, the magnitude of the positive non-zero value being determined by the gray scale level at which the decrease in luminance value occurs.

9. The method of claim 8, further comprising the step of: generating an ISO-Inversion plot for the display device.

10. The method of claim 9, wherein the step of generating the ISO-Inversion plot comprises the steps of:

identifying a maximum value of the inversion values associated with the data sets for each test point;

using the identified maxima to generate a matrix of data vectors containing three values, where two of the data values correspond to the horizontal and vertical inclination values for a selected test point and the third data value corresponds to the maximum inversion value for the test point; and graphically representing the data from the matrix, using the horizontal and vertical inclination values as the axes.

11. The method of claim 2, wherein the measuring step comprises taking at least ten luminance measurements over substantially equal intervals of gray scale level.

12. The method of claim 3, further comprising the step of: associating an inversion value with each data set, the inversion value defined as being:

zero when the normalized luminance value associated with the data set is equal to or greater than the luminance value of the data set for the same test point at the adjacent lower gray scale level;

zero when there is no adjacent lower gray scale level; and a positive non-zero value when the normalized luminance value associated with the data set is less than the luminance value of the data set for the same test point at the adjacent lower gray scale level, the magnitude of the positive non-zero value being determined by the gray scale level at which the decrease in luminance value occurs.

13. The method of claim 12, further comprising the step of: generating an ISO-Inversion plot for the display device.

14. The method of claim 13, wherein the step of generating the ISO-Inversion plot comprises the steps of:

identifying a maximum value of the inversion values associated with the data sets for each test point;

using the identified maxima to generate a matrix of data vectors containing three values, where two of the data values correspond to the horizontal and vertical inclination values for a selected test point and the third data value corresponds to the maximum inversion value for the test point; and graphically representing the data from the matrix, using the horizontal and vertical inclination values as the axes.

15. The method of claim 1, wherein:

the optical display property is contrast ratio between a first gray scale level and a second gray scale level, the second gray scale level being higher than the first; and a contrast ratio value for a predetermined test point is defined as:

zero, if the luminance value at the first gray scale level is zero; and a ratio of the luminance value at the second gray scale level to the luminance value at the first gray scale level if the luminance value at the first gray scale level is not zero.

16. The method of claim 15, further comprising the step of: associating each contrast ratio value with a data set in the matrix.

17. The method of claim 16, further comprising the step of: graphically representing the contrast values, using the horizontal and vertical inclinations as the axes.

18. The method of claim 15, wherein:

luminance values are measured at more than two gray scale levels;

the minimum value of gray scale level is selected as the first gray scale level; and the maximum value of gray scale level is selected as the second gray scale level.

19. The method of claim 1, wherein:

a set of measured luminance values corresponding to the plurality of gray scale levels for each test point in the test grid is used to graphically represent both gray scale inversion and contrast ratio for the display device.

* * * * *